(12) United States Patent
Peng et al.

(10) Patent No.: US 8,107,029 B2
(45) Date of Patent: Jan. 31, 2012

(54) THIN FILM TRANSISTOR SUBSTRATE

(75) Inventors: Jen-Chieh Peng, Miao-Li (TW);
Shuo-Ting Yan, Miao-Li (TW);
Tsau-Hua Hsieh, Miao-Li (TW);
Chao-Yi Hung, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 264 days.

(21) Appl. No.: 12/583,467

(22) Filed: Aug. 21, 2009

(65) Prior Publication Data

US 2010/0053530 A1 Mar. 4, 2010

(30) Foreign Application Priority Data

Aug. 29, 2008 (CN) .......................... 2008 1 0141762

(51) Int. Cl.
*G02F 1/136* (2006.01)
(52) U.S. Cl. ........................................... 349/47; 349/43
(58) Field of Classification Search .................. 349/47, 349/43
See application file for complete search history.

(56) References Cited

U.S. PATENT DOCUMENTS

| 6,580,487 | B1 | 6/2003 | Kim et al. | |
|---|---|---|---|---|
| 6,646,692 | B2 * | 11/2003 | Yamazaki et al. | 349/47 |
| 6,721,026 | B2 | 4/2004 | Cheng et al. | |
| 7,414,264 | B2 * | 8/2008 | Kim et al. | 257/59 |

* cited by examiner

*Primary Examiner* — James Dudek
(74) *Attorney, Agent, or Firm* — Altis Law Group, Inc.

(57) ABSTRACT

An exemplary TFT substrate includes a substrate, signal lines, a common electrode, and a pixel electrode. The signal lines are arranged on the substrate along two perpendicular directions. One of each two signal lines perpendicular to each other includes a plurality of segments. Every two adjacent segments are arranged on two opposite sides of the other signal line of the two signal lines. The TFT substrate further includes a connection line. The connection line interconnects the two adjacent segments. The common electrode is arranged in a same layer as the connection line, and overlaps the segmented signal line along a direction perpendicular to the substrate.

11 Claims, 5 Drawing Sheets

THIN FILM TRANSISTOR SUBSTRATE

BACKGROUND

Technical Field

The present disclosure relates to thin film transistor (TFT) substrates and methods for manufacturing TFT substrates, and more particularly to a TFT substrate with discontinuous signal lines, wherein the TFT substrate can be used in in-plane switching (IPS) mode liquid crystal displays (LCDs) or in fringe-field switching (FFS) mode LCDs.

LCDs have the advantages of portability, low power consumption, and low radiation, and are widely used in portable electronic devices such as notebooks, personal digital assistants (PDAs), video cameras, and so on. Generally, a TFT substrate of an FFS mode LCD includes a plurality of scan lines, a plurality of data lines, a plurality of common electrodes, a plurality of pixel electrodes, and an insulating layer between the data lines and the pixel electrodes. There is only the insulating layer between the data lines and the pixel electrodes. So crosstalk disturbances easily occur between the data lines and the pixel electrodes.

What is needed is a TFT substrate that can overcome the described limitations, and a method for manufacturing such TFT substrate.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

FIG. 1 is a top plan view of part of a TFT substrate 20 of an LCD according to a first embodiment of the present disclosure. The TFT substrate 20 includes a plurality of signal lines 21, a plurality of connection lines 225, a plurality of common electrodes 262, and a plurality of common lines 240.

Figure 1:
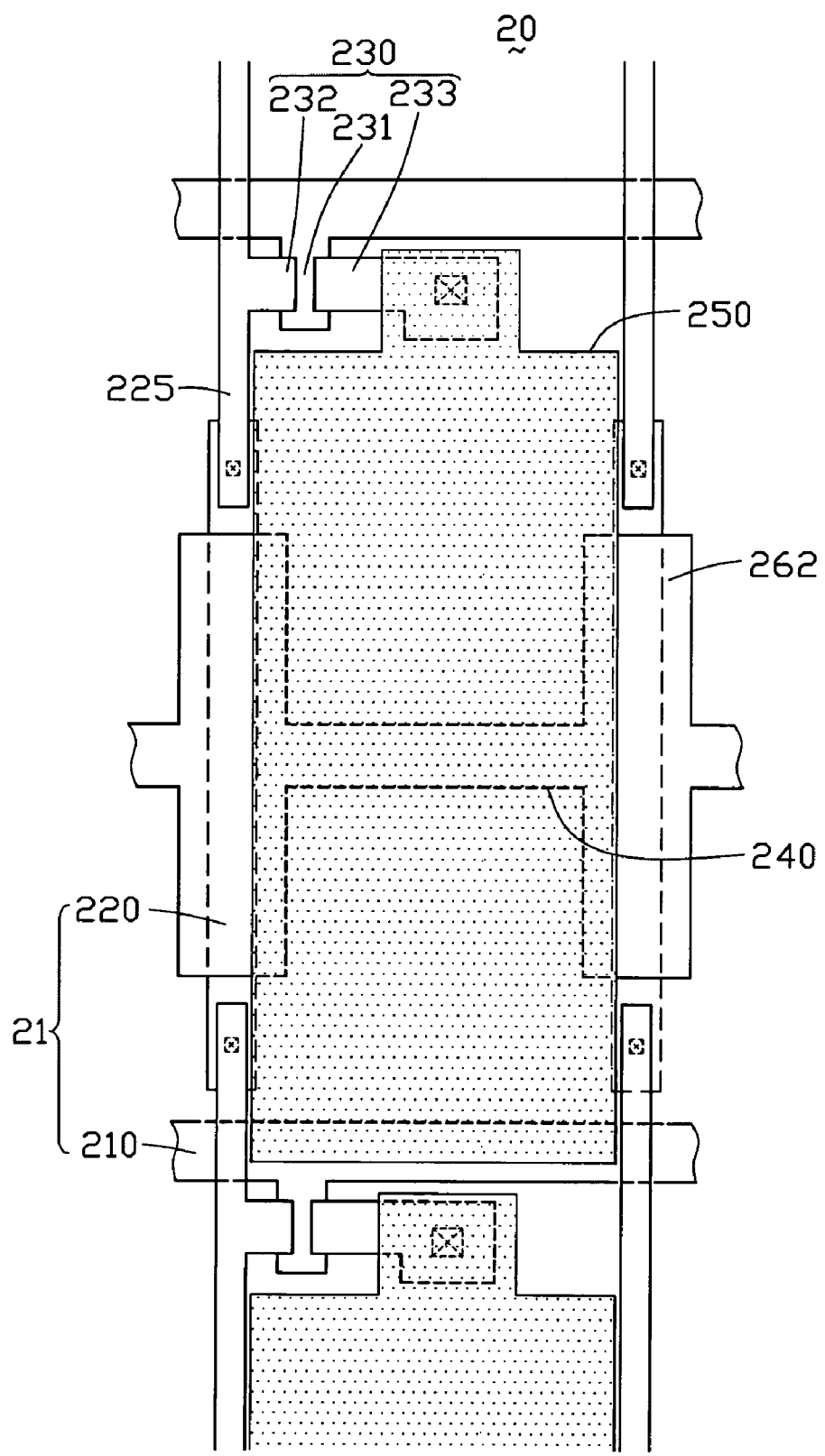
FIG. 1 is a top plan view of part of a TFT substrate of an LCD according to a first embodiment of the present disclosure.

The signal lines 21 include a plurality of scan lines 210 arranged in a plurality of rows for transmitting a plurality of scanning signals, and a plurality of data lines 220 arranged in a plurality of columns for transmitting a plurality of data signals. Each data line 220 is broken into a plurality of portions. Two of the portions are disposed at the two sides of a corresponding scan line 210 and do not touch the scan line 210.

Each connection line 225 is used to connect two corresponding portions of a corresponding data line 220 with two first contact holes 235 respectively. The connection runs across the corresponding scan line 210 perpendicularly and is insulated from the scan line 210. Each common electrode 262 lies along a corresponding data line 220 in a strip shape. The common electrode 262 is wider than the data line 220. Each common line 240 connects two corresponding adjacent common electrodes 262 and is parallel to the corresponding scan line 210.

The scan lines 210, the data lines 220, and the connection lines 225 cooperatively define a plurality of pixel areas (unlabeled). Each pixel area includes a TFT switch 230 and a pixel electrode 250. The TFT switch 230 is disposed at the crossing of a corresponding connection line 225 and a corresponding scan line 210. Each TFT switch 230 includes a gate electrode 231, a source electrode 232, and a drain electrode 233. The gate electrode 231 is connected to the scan line 210, the source electrode 232 is connected to the connection line 225, and the drain electrode 233 is connected to the pixel electrode 250. Edges of the pixel electrode 250 partly overlap the corresponding common electrode 262 and the scan line 210 respectively.

Figure 2:
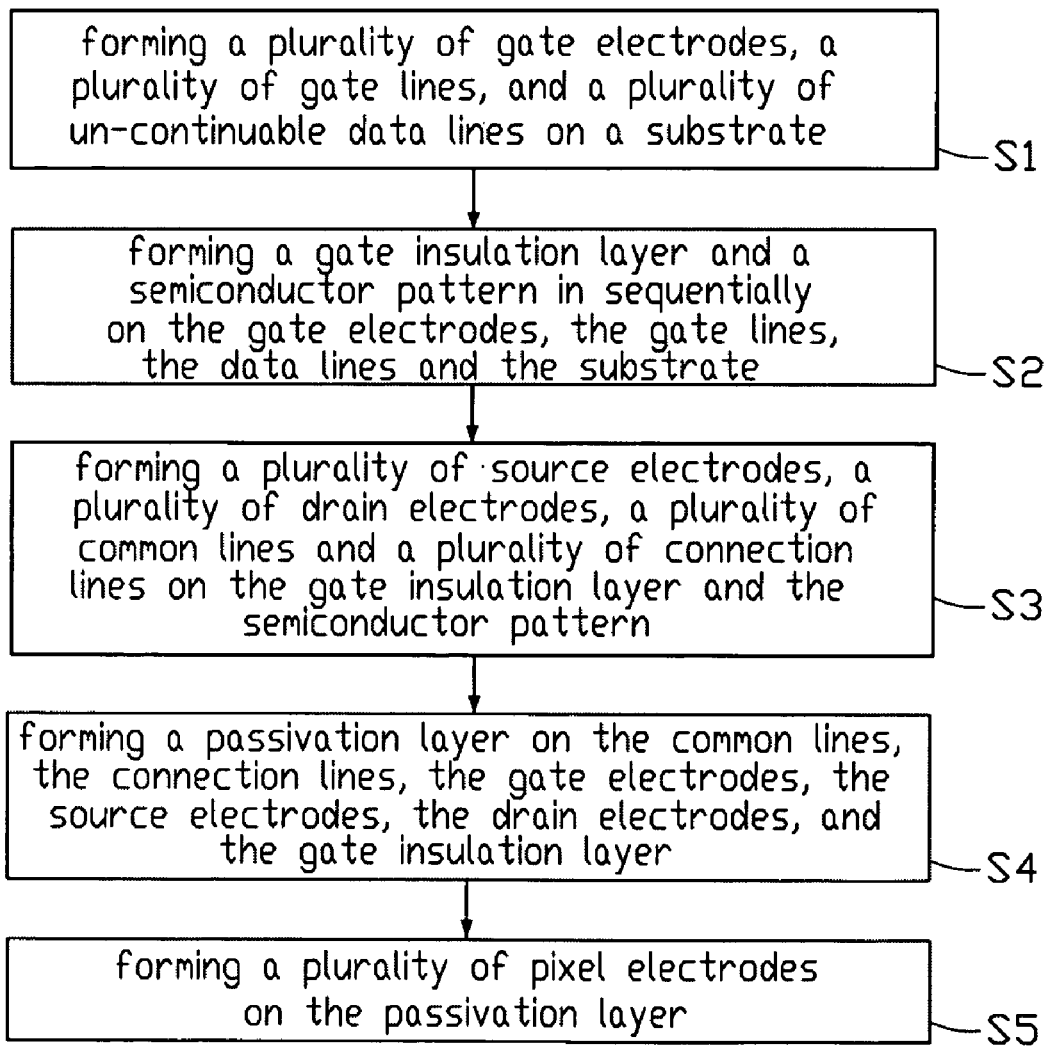
FIG. 2 is a flowchart of a method for manufacturing a TFT substrate, such as, for example, that of FIG. 1, according to a method embodiment of the present disclosure.

FIG. 2 is a flowchart of a method for manufacturing a TFT substrate 20, such as, for example, that of FIG. 1, according to a method embodiment of the present disclosure. The manufacturing method includes, in step S1, forming a plurality of gate electrodes, a plurality of gate lines, and a plurality of discontinuous data lines on a substrate, in step S2, forming a gate insulation layer and a semiconductor pattern in sequence on the gate electrodes, the gate lines, the data lines and the substrate, in step S3, forming a plurality of source electrodes, a plurality of drain electrodes, a plurality of common lines and a plurality of connection lines on the gate insulation layer and the semiconductor pattern, in step S4, forming a passivation layer on the common lines, the connection lines, the gate electrodes, the source electrodes, the drain electrodes, and the gate insulation layer, and in step S5, forming a plurality of pixel electrodes on the passivation layer.

Figure 3:
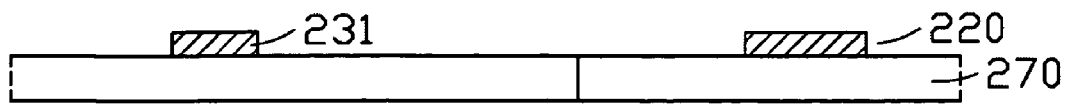
FIGS. 3-7 are cross-sections of successive steps in manufacturing the TFT substrate of FIG. 1 according to the method of FIG. 2.

In step S1, referring to FIG. 3, a substrate 270 is provided. A conducting metal film is coated on the substrate 270 to form a first conducting metal layer (not shown). A first photoresist process is applied to the first conducting metal layer to form the gate electrodes 231, the scan lines 210, and the discontinuous data lines 220. Each two adjacent portions of the data lines 220 are disposed on the two sides of a corresponding scan line 210 respectively, and do not touch the scan line 210.

Figure 4:
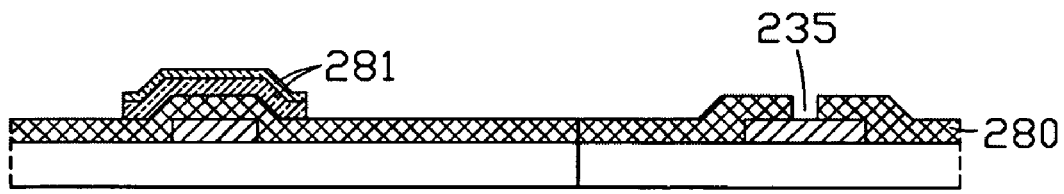

In step S2, referring to FIG. 4, a gate insulation layer 280 is deposited on the first conducting metal layer and the substrate 270. The material of the gate insulation layer 280 can be silicon nitride. Then, an a–Si intrinsic layer and an n+Si ohmic contact layer are deposited on the gate insulation layer 280 in sequence by Chemical Vapor Deposition (CVD). A second photoresist process is applied to form a plurality of first contact holes 235 and a semiconductor pattern layer 281. The data lines 220 are exposed by the first contact holes 235.

Figure 5:
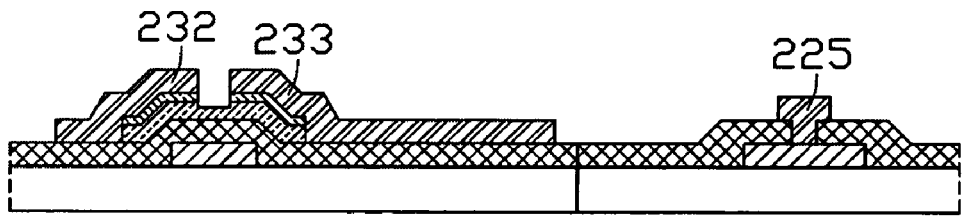

In step S3, referring to FIG. 5, a conducting metal film is coated on the semiconductor pattern layer 281 and the gate insulation layer 280 to form a second conducting metal layer (not shown). A third photoresist process is applied to the second conducting metal layer to form the source electrodes 232, the drain electrodes 233, the common electrodes 262 and the connection lines 225. The common electrodes 262 cover the data lines 220. The connection lines 225 contact the data lines 220 via the first contact holes 235.

Figure 6:
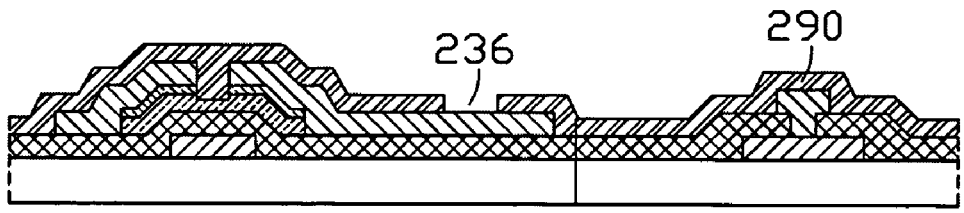

In step S4, referring to FIG. 6, a passivation layer 290 is coated on the second conducting metal layer and the gate insulation layer 280. A fourth photoresist process is applied to the passivation layer 290 to form a plurality of second contact holes 236.

Figure 7:
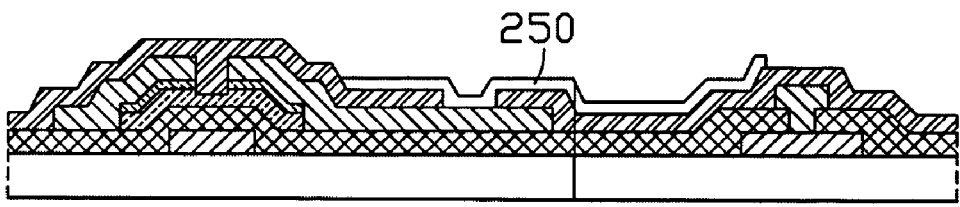

In step S5, referring to FIG. 7, a transparent conducting layer is coated on the passivation layer 290 by sputtering. The transparent conducting layer is connected to the drain electrodes 233 via the second contact holes 236. A fifth photoresist process is applied to the transparent conducting layer to form a plurality of pixel electrodes 250 according to the pixel areas. The material of the transparent conducting layer can be indium tin oxide (ITO) or indium zinc oxide (IZO).

Figure 8:
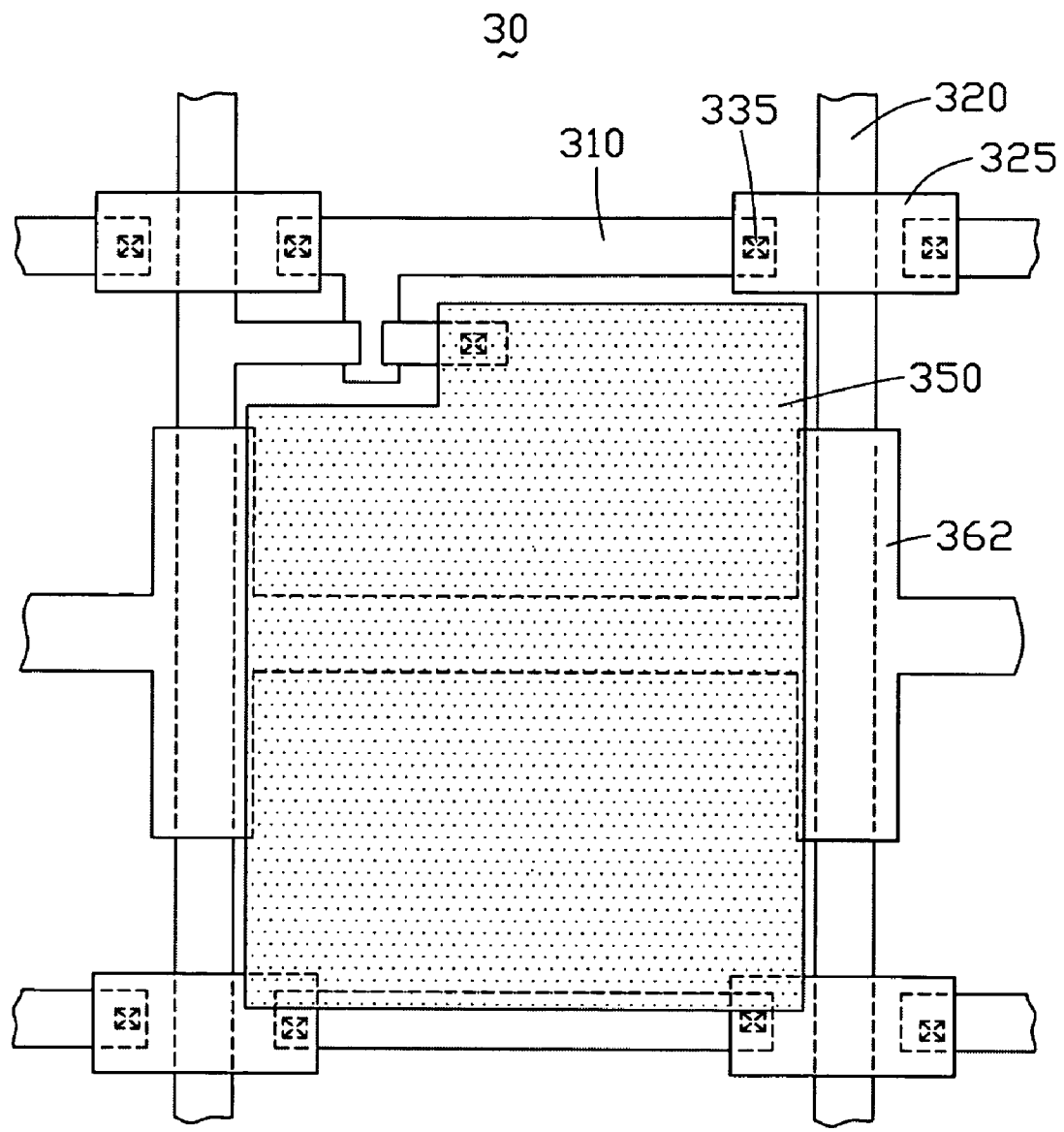
FIG. 8 is a top plan view of part of a TFT substrate of an LCD according to a second embodiment of the present disclosure.

FIG. 8 is a top plan view of part of a TFT substrate 30 of an LCD according to a second embodiment of the present disclosure. The structure of the TFT substrate 30 is similar to the TFT substrate 20. The main differences between the TFT substrate 30 and the TFT substrate 20 are as follows. A plurality of data lines 320 each have continuous structure. Each scan line 310 is broken into a plurality of portions. Two of the portions are disposed at the two sides of a corresponding data line 320 and do not touch the data line 320. Each connection line 325 is disposed between two corresponding adjacent portions of a corresponding scan line 310, and contacts the two adjacent portions of the scan line 310 via two first contact holes 335.

Figure 9:
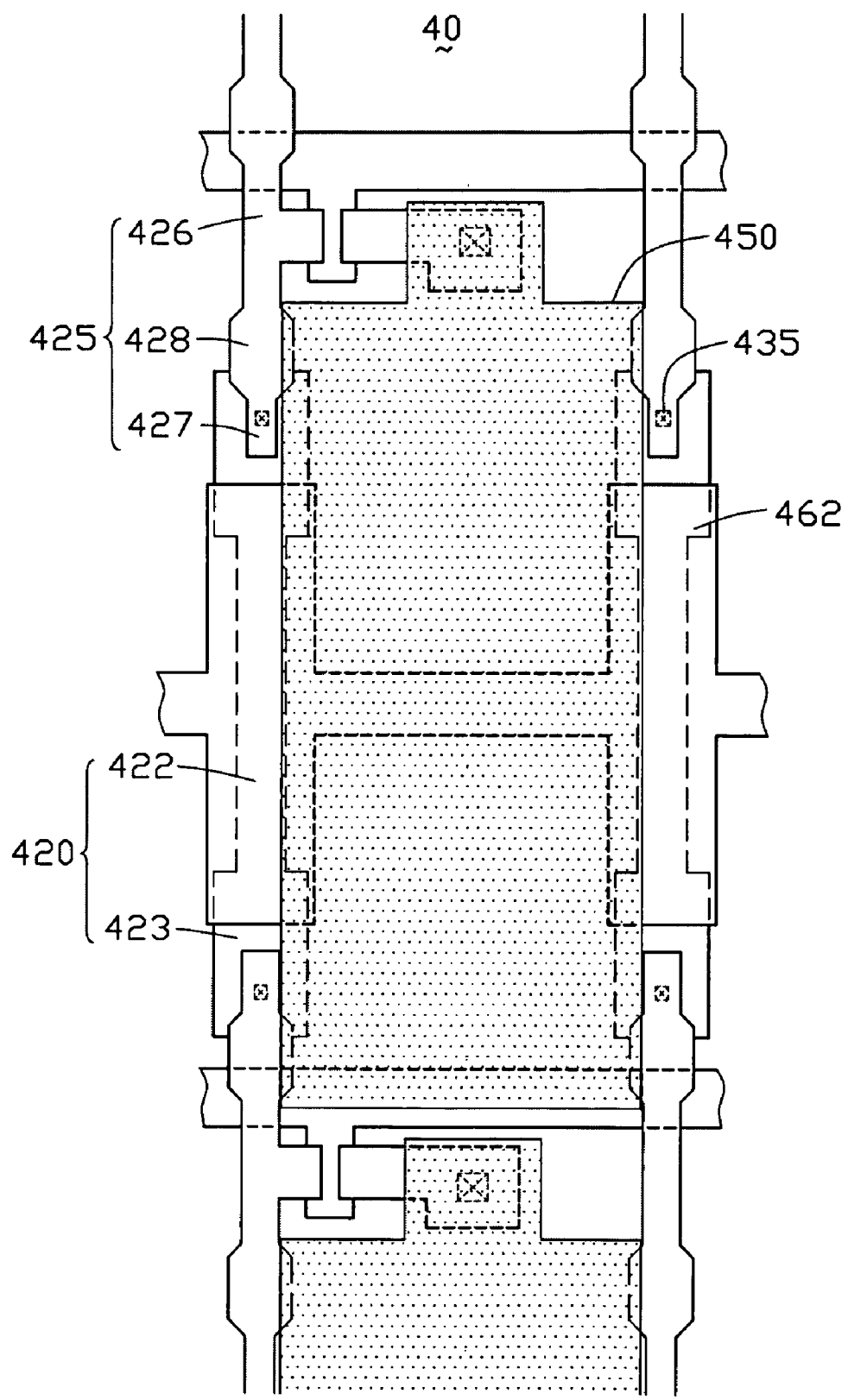
FIG. 9 is a top plan view of part of a TFT substrate of an LCD according to a third embodiment of the present disclosure.

FIG. 9 is a top plan view of part of a TFT substrate of an LCD according to a third embodiment of the present disclosure. The structure of the TFT substrate 40 is similar to the TFT substrate 20. The main differences between the TFT substrate 40 and the TFT substrate 20 are as follows. The TFT substrate includes a plurality of common electrodes 462. Each data line 420 includes a first main body 422 and a plurality of first extensions 423. Each connection line 425 includes a second main body 426, two connections 427, and a plurality of second extensions 428. The first extensions 423 are disposed on the two ends of the first main body 422 respectively, and the second extensions 428 are disposed on the two ends of the second main body 426 respectively. Each connection 427 is electrically connected to a corresponding first extension 423. The first extensions 423 and the second extension extensions 428 are overlapped by the edges of corresponding pixel electrodes 450.

Compared with the prior art, the common electrodes are disposed to cover the data lines or the scan lines while being insulated from the data lines or the scan lines. So the signals transmitted by the data lines will not disturb the voltages of the pixel electrodes. The edges of each pixel electrode can extend to the corresponding data lines and yield a high aperture ratio.

What is claimed is:

1. A thin film transistor (TFT) substrate, comprising:
a substrate, a plurality of signal lines, a common electrode and a pixel electrode, the signal lines arranged in a plurality of rows for transmitting a plurality of scanning signals, and a plurality of columns for transmitting a plurality of data signals, the pixel electrode disposed at ends of the signal lines which are away from the substrate and isolated from the signal lines, wherein each two of the signal lines that are perpendicular to each other have a signal line broken and untouchedly disposed at two ends of the other signal line, wherein the signal lines for transmitting a plurality of data signals serving as data lines are discontinuous, each discontinuous data line includes a plurality of first main bodies and each first main body with a plurality of first extensions, the first extensions are disposed on two ends of the first main body respectively, and the TFT substrate further comprises a connection line disposed between the discontinuous data lines and the pixel electrode, and the common electrode and the connection line are disposed substantially in a same layer and cover the discontinuous data lines in a direction vertical to the substrate.

2. The TFT substrate of claim 1, wherein the connection line includes a second main body, two connections, and a plurality of second extensions, the second extensions are disposed on two ends of the second main body respectively, the first extensions of one of the discontinuous data lines are overlapped by an edge of the pixel electrode, and one of the second extensions of the connection line is overlapped by the edge of the pixel electrode.

3. The TFT substrate of claim 1, wherein the connection line interconnects two discontinuous portions of one of the discontinuous data lines via two first contact holes respectively.

4. The TFT substrate of claim 1, wherein the common electrode is wider than each of the discontinuous data lines.

5. A thin film transistor (TFT) substrate, comprising:
a substrate, a plurality of signal lines, a common electrode and a pixel electrode, the signal lines arranged in a plurality of rows for transmitting a plurality of scanning signals, and a plurality of columns for transmitting a plurality of data signals, wherein each two of the signal lines that are perpendicular to each other have a signal line broken into two portions disposed at two sides of the other signal line and not touching the other signal line, wherein the TFT substrate further comprises a connection line interconnecting the two portions of the broken signal line, the common electrode and the connection line are disposed substantially in a same layer, the connection line is perpendicular to and isolated from the other signal line, the common electrode covers the broken signal line in a direction parallel to the broken signal line, and the common electrode is wider than the broken signal line.

6. The TFT substrate of claim 5, wherein the broken signal line is a broken data line.

7. The TFT substrate of claim 6, wherein the connection line interconnects the two portions of the broken data line via two first contact holes respectively.

8. A thin film transistor (TFT) substrate, comprising:
a substrate, a plurality of signal lines, a common electrode and a pixel electrode, the signal lines arranged in a plurality of rows for transmitting a plurality of scanning signals, and a plurality of columns for transmitting a plurality of data signals, the pixel electrode being disposed at a side of the signal lines which is away from the substrate and being isolated from the signal lines,
wherein each signal line for transmitting data signals comprises a plurality of discontinuous portions, two of the portions are disposed at two sides of a corresponding one of the signal lines for transmitting scanning signals, each portion includes a first main body and a plurality of first extensions, and the first extensions are disposed on two ends of the first main body respectively; and
a plurality of connection lines, one of the connection lines interconnecting the two portions at corresponding first extensions of the two portions and being disposed between the two portions and the pixel electrode, the common electrode and the connection line being disposed substantially in a same layer, the common electrode covering one of the two portions in a direction vertical to the substrate, and the connection line covering the two portions in a direction vertical to the substrate.

9. The TFT substrate of claim 8, wherein each connection line includes a second main body, two connections, and a plurality of second extensions, the second extensions are disposed on two ends of the second main body respectively, the first extensions of the one of the two portions are overlapped by an edge of the pixel electrode, and one of the second extensions of the connection line is overlapped by the edge of the pixel electrode.

10. The TFT substrate of claim 8, wherein the connection line interconnects the two portions via two first contact holes respectively.

11. The TFT substrate of claim 8, wherein the common electrode is wider than each of the signal lines for transmitting data signals.

* * * * *